United States Patent
Wu et al.

(10) Patent No.: US 6,817,061 B2
(45) Date of Patent: Nov. 16, 2004

(54) HINGE FOR FOLDABLE CELLULAR PHONES

(76) Inventors: Jiin-Chang Wu, No. 3-9, Guangfu Rd., Taichung (TW); Hung-Yueh Huang, No. 19, Chi-Shih St., South Dist., Taichung (TW)

(*) Notice: Subject to any disclaimer, the term of this patent is extended or adjusted under 35 U.S.C. 154(b) by 53 days.

(21) Appl. No.: 10/407,443

(22) Filed: Apr. 7, 2003

(65) Prior Publication Data
US 2004/0020013 A1 Feb. 5, 2004

(30) Foreign Application Priority Data
Jul. 31, 2002 (TW) .................................. 91211694 U

(51) Int. Cl.⁷ ............................................. E05F 1/08
(52) U.S. Cl. ............................. 16/308; 16/304; 16/342; 16/386; 16/54
(58) Field of Search ..................... 16/304, 307, 308, 16/285, 386, 342, 54; 379/433.13; 403/119, 120

(56) References Cited

U.S. PATENT DOCUMENTS

| | | | | |
|---|---|---|---|---|
| 3,860,993 A | * | 1/1975 | Matuska | 16/52 |
| 4,893,522 A | * | 1/1990 | Arakawa | 74/574 |
| 5,142,738 A | * | 9/1992 | Ojima | 16/306 |
| 5,211,269 A | * | 5/1993 | Ohshima | 188/290 |
| 5,382,108 A | * | 1/1995 | Ojima | 403/120 |
| 6,336,252 B1 | * | 1/2002 | Bando | 16/307 |
| 6,601,269 B2 | * | 8/2003 | Oshima et al. | 16/342 |

FOREIGN PATENT DOCUMENTS

| | | | | | |
|---|---|---|---|---|---|
| GB | 2327009 A | * | 1/1999 | ............ | H04M/1/02 |
| JP | 2003090327 A | * | 3/2003 | ............ | F16C/11/10 |
| JP | 2003194041 A | * | 7/2003 | ............ | F16C/11/10 |
| JP | 2003343544 A | * | 12/2003 | ............ | F16C/11/10 |

* cited by examiner

Primary Examiner—Chuck Y. Mah
(74) Attorney, Agent, or Firm—Rosenberg, Klein & Lee

(57) ABSTRACT

A hinge for a cellular phone that has a cover and a base comprises an inner sleeve, an outer sleeve and a spring. The spring is mounted between the inner sleeve and the outer sleeve and provides a torsion force to open the cover. A layer of buffering gel is applied the outer surface of the inner sleeve between the inner sleeve and the outer sleeve to damp the opening rate of the cover so that the pivoting device can keep a wire between the cover and the base from breaking.

5 Claims, 6 Drawing Sheets

HINGE FOR FOLDABLE CELLULAR PHONES

BACKGROUND OF THE INVENTION

1. Field of the Invention

The present invention relates to a hinge, and more particularly to a hinge for foldable cellular phones.

2. Description of Related Art

Small hand-held electronic products such as cellular telephones, PDAs, electronic dictionaries, games, etc. have become very popular. Many of the small hand-held electronic products have a base and a cover. Besides protecting buttons on the body, the cover has a display mounted on an inside surface, and wires connect the display to the body. A hinge is pivotally connected to the cover and the base, and often has a spring to provide a torsional resilient force to open the cover of the electronic device. When the cover is closed and latched, the spring has a torsion force so the cover will open when the latch is released. The conventional hinge for a cellular phone has the follow shortcomings.

When the cover of the cellular phone is flipped open or closed quickly and often and the hinge does not have a buffering feature, the wires between the cover and the base will fatigue and break. When the wires connecting the display to the body break, the cellular phone must be repaired or replaced.

To overcome the shortcomings, the present invention provide hinge for cellular phones that have a buffering feature to mitigate or obviate the aforementioned problem.

SUMMARY OF THE INVENTION

The primary objective of the present invention is to provide a hinge with a buffering feature for a cellular phone particularly a small hand-held cellular phone with a body, a cover and a wire connecting a display in the cover to the body. The hinge in accordance with the present invention comprises an inner sleeve, an outer sleeve and a spring. The spring is mounted between the inner sleeve and the outer sleeve and provides a torsional resilient force to position the cover and the base. The inner sleeve has an outside surface, and the outside surface of the inner sleeve is coated with a layer of buffering gel to reduce the opening rate so operation of the hinge will not cause the wire to fatigue and break.

Other objects, advantages and novel features of the invention will become more apparent from the following detailed description when taken in conjunction with the accompanying drawings.

DETAILED DESCRIPTION OF THE PREFERRED EMBODIMENT

Figure 1:
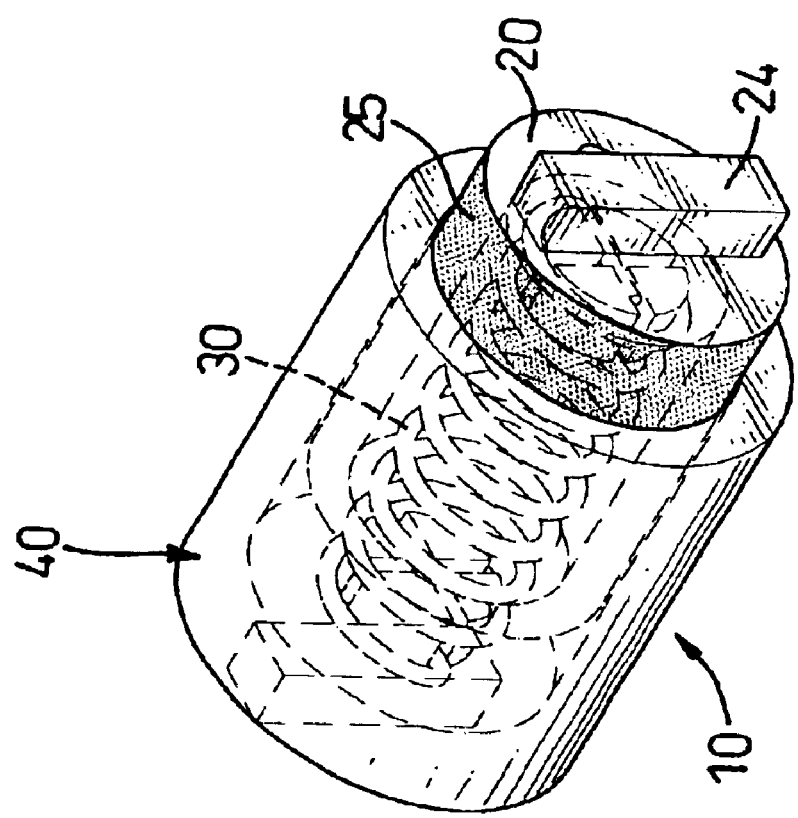
FIG. 1 is a perspective view of a hinge for a cellular phone in accordance with the present invention.
Figure 2:
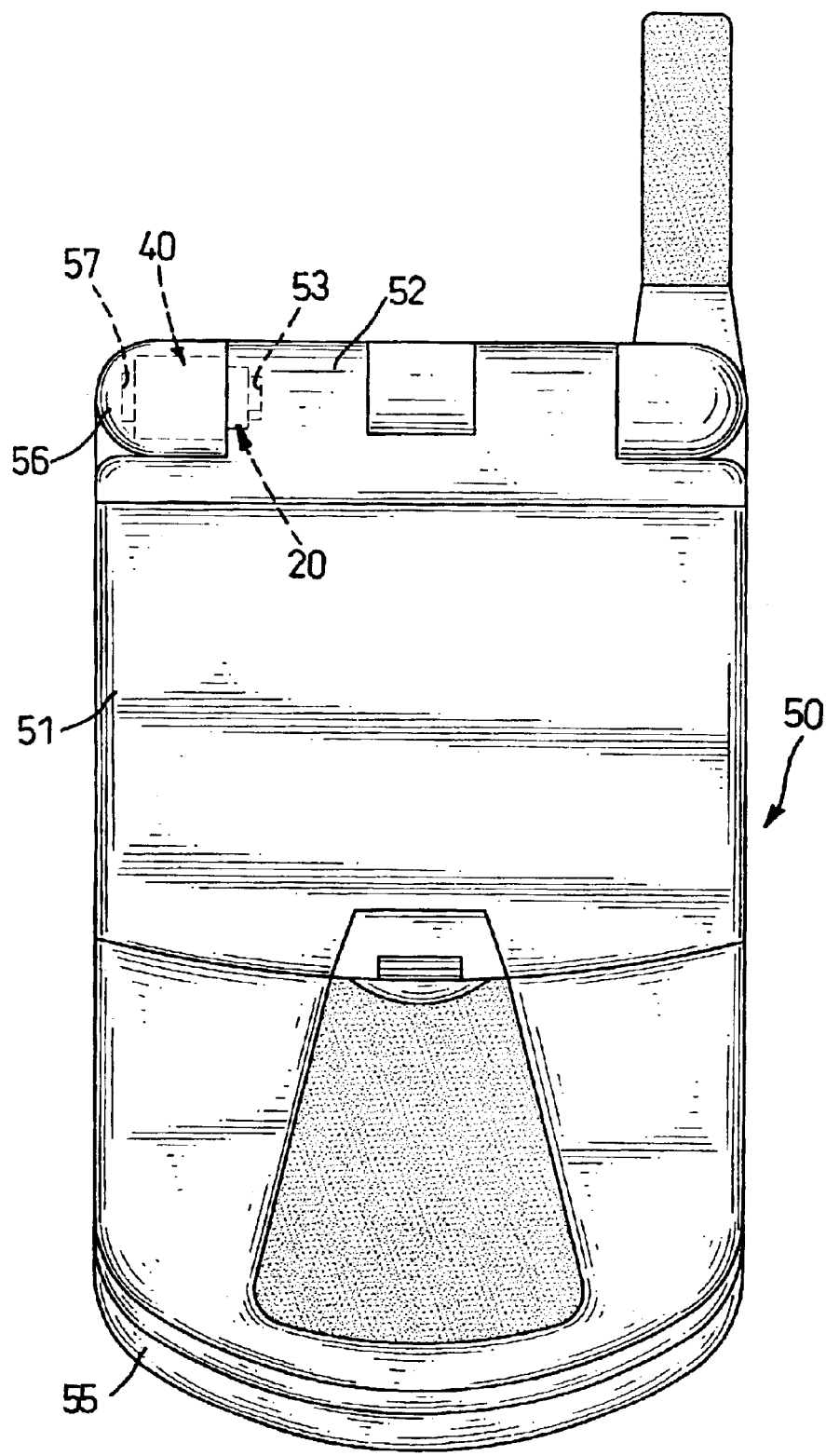
FIG. 2 is an operational perspective view of the hinge in FIG. 1 mounted in a cellular telephone.
Figure 3:
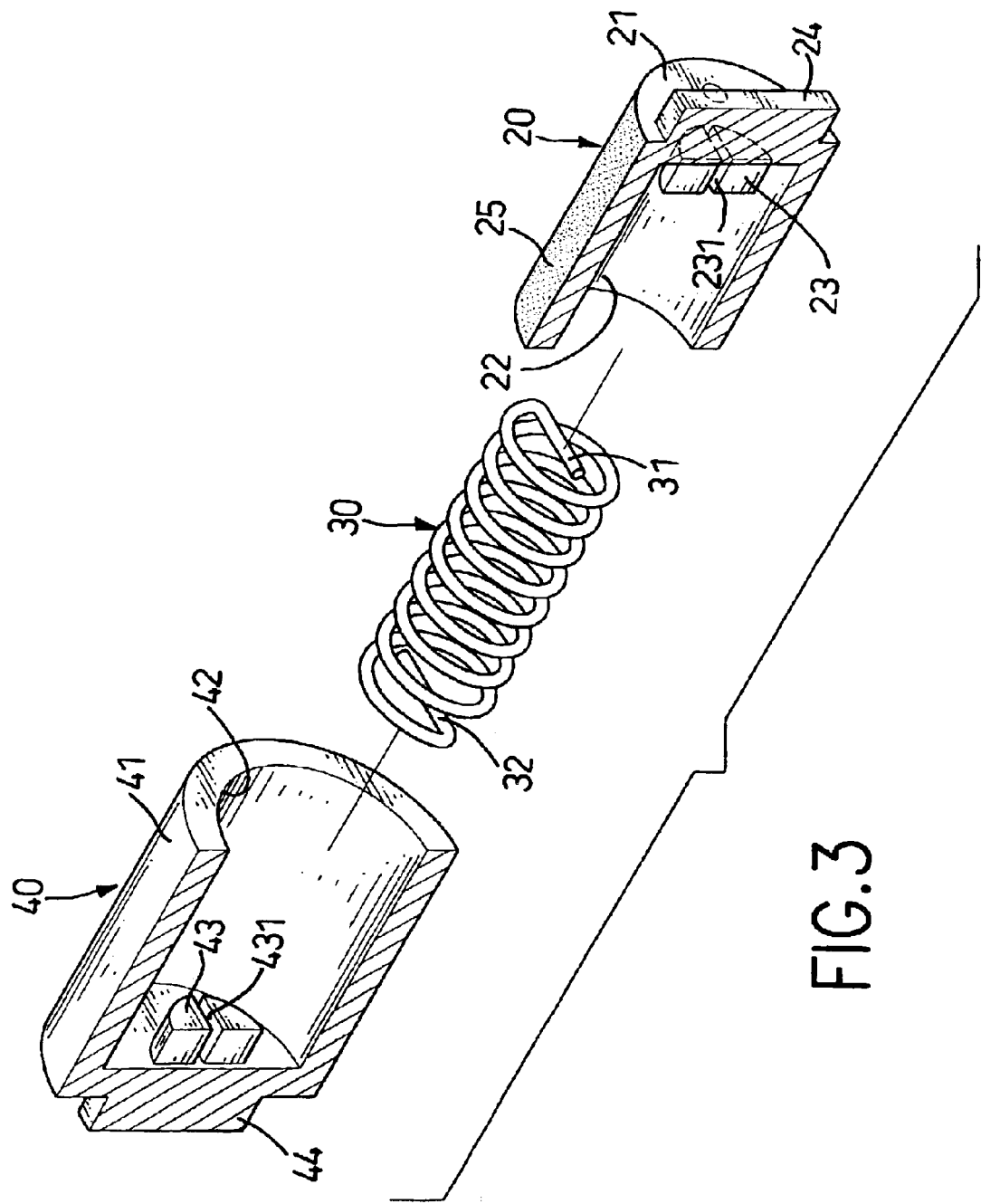
FIG. 3 is an exploded perspective view of the hinge in FIG. 1.

With reference to FIGS. 1 to 3, a hinge (10) in accordance with the present invention for a cellular phone (50) that has a cover (51) and a base (55) comprises an inner sleeve (20), a spring (30) and an outer sleeve (40). The cover (51) and the base (55) both have an outside surface (not numbered), an inside surface (not numbered), a proximal end (not numbered), a distal end (not numbered) and four edges (not numbered). Two end leaves (56) and two interior leaves (52) are alternately formed on the proximal ends of the cover (51) and the base (55). The hinge (10) is mounted in one of the end leaves (56) and an adjacent interior leaf (52).

The inner sleeve (20) of the hinge (10) is a cylindrical tube and has a closed end (21), an open end (not numbered), an outside surface (not numbered), a layer of buffering gel (25) and a keyed interior cavity (22). The closed end (21) has an outside surface (not numbered), an inside surface (not numbered), a first protruding key (24) and a first spring bracket (23). The first protruding key (24) is rectangular and is formed on and protrudes from the outside surface of the closed end (21). The first spring bracket (23) is cylindrical, has a diametric slot (231) and a diameter smaller than the interior cavity (22) and is defined on the inside surface of the closed end (21). The diametric slot (231) is formed perpendicular to the first protruding key (24). The outside surface of the inner sleeve (20) is coated with the layer of buffering gel (25). The buffering gel (25) is non-hardening.

The outer sleeve (40) of the pivoting device (10) is a cylindrical tube and has an open end (not numbered), a closed end (not numbered), an outside surface (41) and an interior cavity (42). The closed end has an outside surface (not numbered), an inside surface (not numbered), a second protruding key (44) and a second spring bracket (43). The second protruding key (44) is rectangular and is formed on and protrudes from the outside surface of the closed end. The second spring bracket (43) is cylindrical, has a diametric slot (431) and a diameter the same as the first spring bracket (23) in the inner sleeve (20) and is defined on the inside surface of the closed end. The diametric slot (431) is formed perpendicular to the second protruding key (44). The interior cavity (42) has a diameter slightly larger than outside surface of the inner sleeve (20) so the inner sleeve (20) can be rotatably mounted in the outer sleeve (40), and the layer of buffering gel (25) is in contact with the interior cavity (42).

The spring (30) is a coil spring and has a proximal end (31), a distal end (32) and a diameter slightly larger than the spring brackets (23, 43). The proximal end (31) and the distal end (32) are straight, are formed diametric to the spring (30) and are mounted in the diametric slots (231, 431) in the inner sleeve (20) and outer sleeve (40) respectively. The diameter of the spring (30) is slightly larger than the spring brackets (23, 43) so the spring (30) is mounted around the spring brackets (23, 43) and the ends (31, 32) fully seat in the diametric slots (231, 431).

Figure 4:
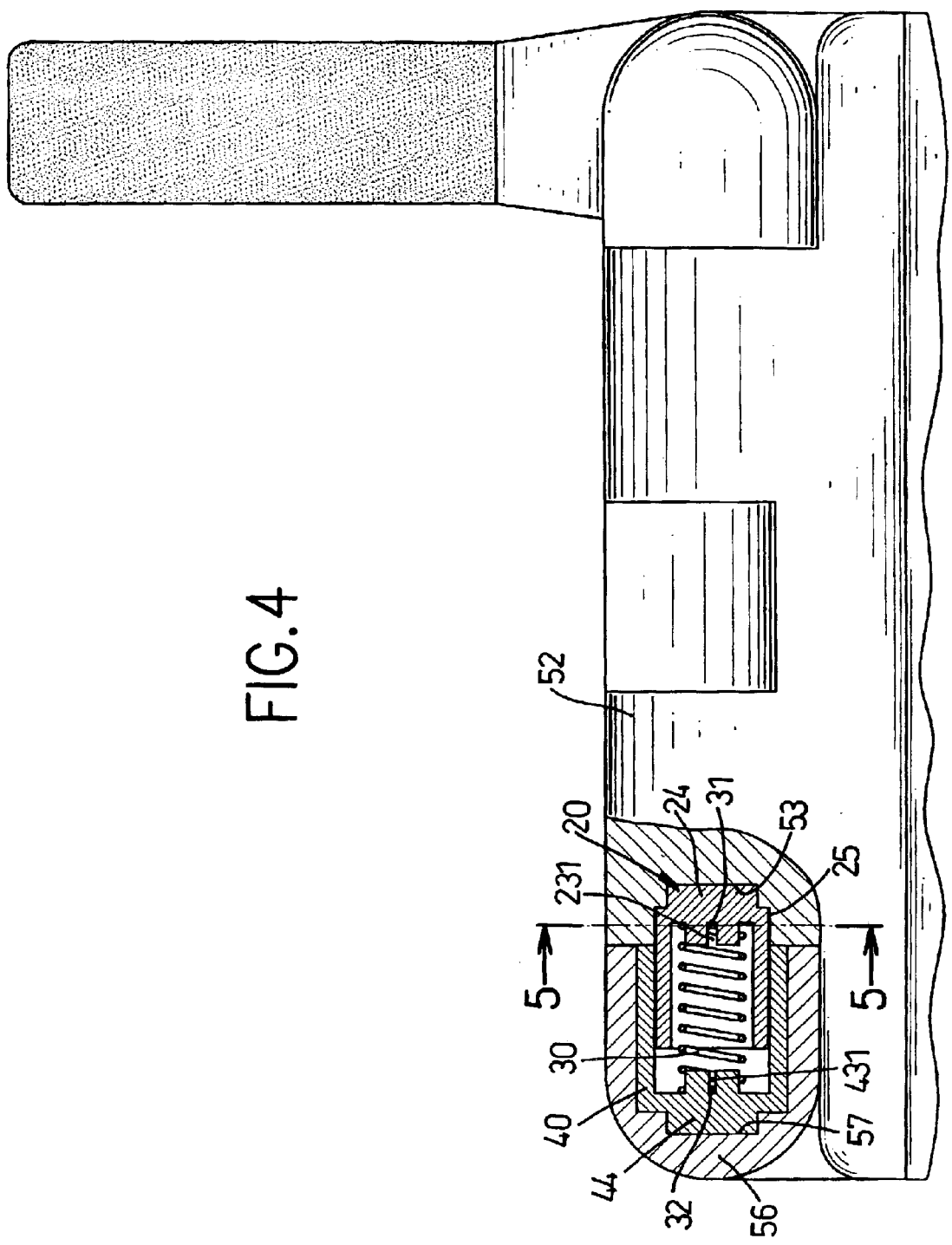
FIG. 4 is a top plan view of the hinge in FIG. 1 in a cellular telephone.

With reference to FIGS. 2 and 4, the outer sleeve (40) is securely mounted in an end leaf (56) so the open end of the outer sleeve (40) abuts the adjacent interior leaf (52). The closed end (21) of the inner sleeve (20) is mounted in the adjacent interior leaf (52), and the inner sleeve (20) protrudes into the outer sleeve (40). A keyed slot (53) is defined in the interior leaf (52) to securely hold the first keyed protrusion (24) on the inner sleeve (20). A keyed slot (57) is defined in the end leaf (56) to securely hold the second keyed protrusion (44) on the outer sleeve (40).

Figure 5:
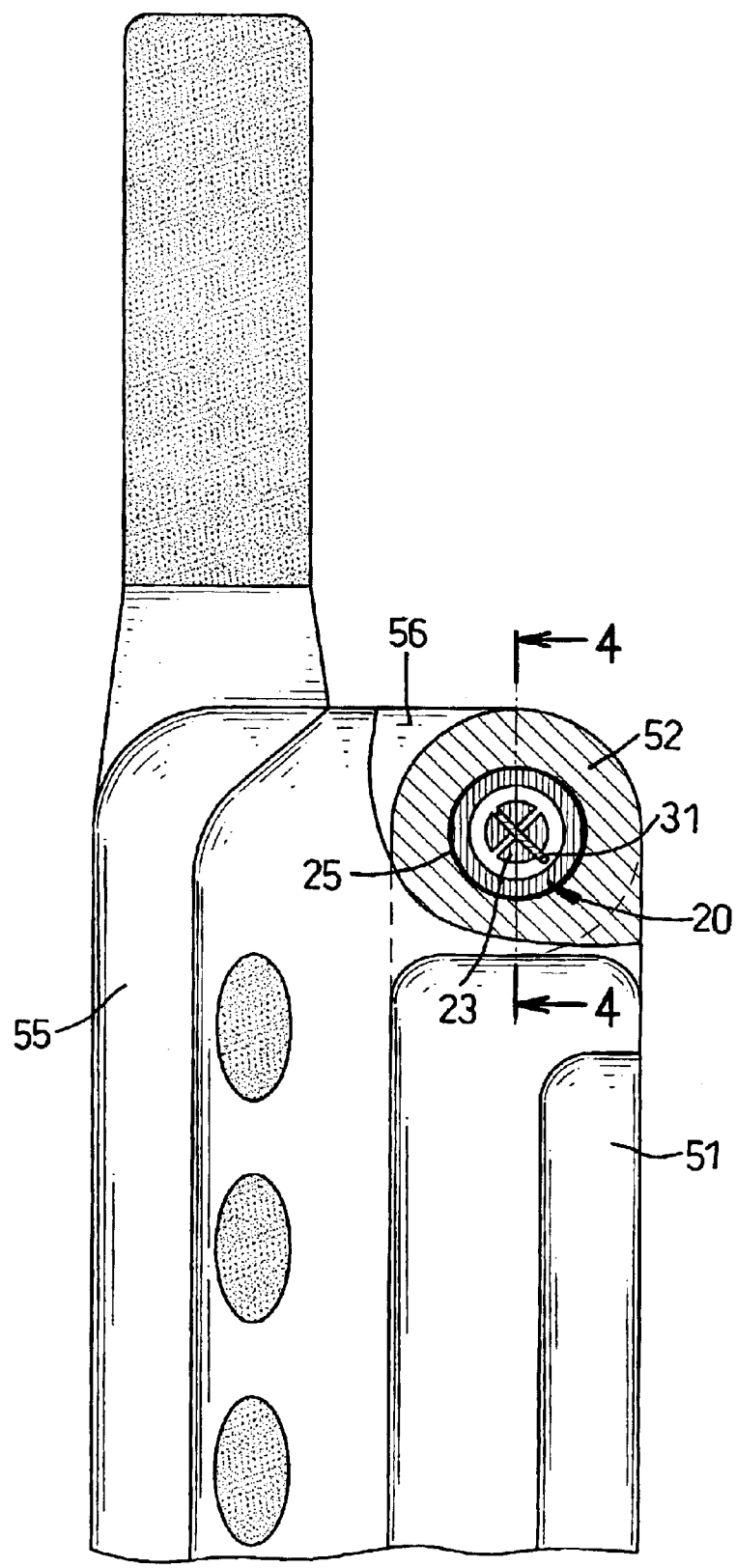
FIG. 5 is a side plan view of the hinge in FIG. 1 in a cellular telephone with the cover closed.

With reference to FIGS. 3 and 5, a torsional resilient force is generated in the spring (30) when the cover (51) is closed by rotating the inner sleeve (20) and the proximal end (31) of the spring (30) with respect to the outer sleeve (40) and the distal end (32) of the spring (30) that are held stationary.

Figure 6:
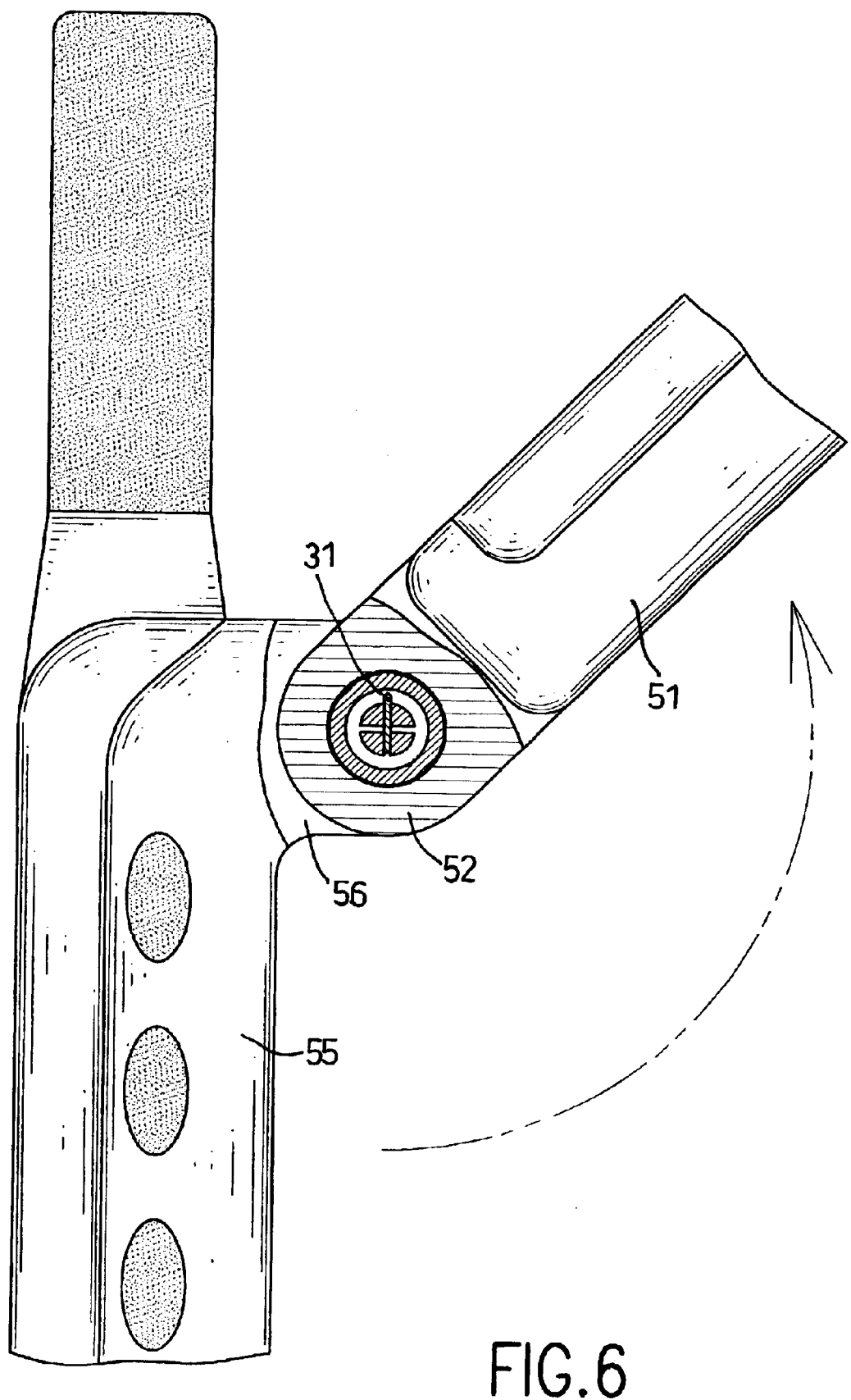
FIG. 6 is a side plan view of the hinge in FIG. 1 in a cellular telephone with the cover open.

With reference to FIGS. 3 and 6, the resilient force stored in the spring (30) causes the cover (51) to open when the cover (51) is released from the base (55) and the layer of buffering gel (25) causes the cover (51) to open slowly.

The spring (30) in the hinge (10) opens the cover (51), and the buffering gel (25) keeps the cover (51) from opening too quickly. Consequently, the hinge (10) protects the wire between the cover (51) and the base (55).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge for a cellular phone having a base and a cover, the hinge comprising
    an outer sleeve having
        an open end;
        a closed end having an outside surface adapted to be securely attached to cellular phone and an inside surface; and
        an interior cavity with an inner surface;
    an inner sleeve rotatably received in the interior cavity in the outer sleeve and having
        an interior cavity;
        a closed end having an outside surface adapted to be securely attached to the cellular phone and an inside surface;
        an open end; and
        an outside surface;
    a layer of buffering gel applied to the outside surface of the inner sleeve and in contact with the inner surface of the interior cavity of the outer sleeve; and
    a spring mounted between the outer sleeve and the inner sleeve to provide a torsion force to the inner sleeve and having a proximal end securely attached to the inside surface of the inner sleeve and a distal end securely attached to the inside surface of the outer sleeve.

2. The hinge as claimed in claim 1, wherein the closed end of the inner sleeve has
    a first protruding key formed on the outside surface and adapted to engage with the cover of the cellular phone;
    a first spring bracket formed on the inside surface of the closed end of the inner sleeve and having a diameter smaller than the interior cavity; and
    a first diametric slot formed in the first spring bracket and perpendicular to the first protruding key;
    wherein the proximal end of the spring is straight, is formed diametric to the spring, is mounted in the first diametric slot in the first spring bracket in the inner sleeve and has a diameter slightly larger than the diameter of the first spring bracket.

3. The hinge as claimed in claim 2, wherein the closed end of the outer sleeve has
    a second protruding key formed on the outside surface and adapted to engage with the base of the cellular phone;
    a second spring bracket formed on the inside surface of the closed end of the outer sleeve; and
    a second diametric slot formed in the second spring bracket and perpendicular to the second protruding key;
    wherein the distal end of the spring is straight, is formed diametric to the spring, is mounted in the second diametric slot in the second spring bracket in the outer sleeve and has a diameter slightly larger than the diameter of the second spring bracket.

4. The pivoting device as claimed in claim 3, wherein the second spring bracket in the outer sleeve has a diameter the same as the first spring bracket in the inner sleeve.

5. The pivoting device as claimed in claim 1, wherein the buffering gel is non-hardening.

* * * * *